United States Patent
Chisa et al.

(10) Patent No.: US 9,317,390 B2
(45) Date of Patent: Apr. 19, 2016

(54) COLLECTING, AGGREGATING, AND PRESENTING ACTIVITY DATA

(75) Inventors: Ellen Lizabeth Chisa, Seattle, WA (US); Rajesh Ramanathan, Redmond, WA (US); Hubert Van Hoof, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1003 days.

(21) Appl. No.: 13/152,330

(22) Filed: Jun. 3, 2011

(65) Prior Publication Data

US 2012/0311447 A1     Dec. 6, 2012

(51) Int. Cl.

| | |
|---|---|
| *G06F 3/00* | (2006.01) |
| *G06F 3/16* | (2006.01) |
| *G06F 3/033* | (2013.01) |
| *G06F 11/30* | (2006.01) |
| *G06F 11/34* | (2006.01) |
| *G06F 11/32* | (2006.01) |

(52) U.S. Cl.
CPC ............ *G06F 11/3082* (2013.01); *G06F 11/32* (2013.01); *G06F 11/3438* (2013.01); *G06F 11/3466* (2013.01); *G06F 2201/865* (2013.01)

(58) Field of Classification Search
CPC . G06F 11/3438; G06F 11/3082; G06F 11/32; G06F 11/3466; G06F 2201/865
USPC ......................................... 715/963, 863, 719
See application file for complete search history.

(56) References Cited

U.S. PATENT DOCUMENTS

| | | | |
|---|---|---|---|
| 6,918,089 B2 * | 7/2005 | Uchida et al. ................ 715/751 |
| 7,333,976 B1 | 2/2008 | Auerbach et al. | |
| 7,788,592 B2 * | 8/2010 | Williams et al. .............. 715/764 |
| 7,792,868 B2 * | 9/2010 | Finkelstein et al. .......... 707/798 |
| 8,099,679 B2 * | 1/2012 | Yee et al. ...................... 715/825 |
| 8,219,932 B2 * | 7/2012 | Rhee et al. .................... 715/838 |
| 8,380,866 B2 * | 2/2013 | Savitzky et al. .............. 709/231 |
| 8,707,186 B2 * | 4/2014 | Kashi ............................ 715/751 |
| 2002/0073059 A1 * | 6/2002 | Foster et al. ..................... 707/1 |
| 2002/0178206 A1 * | 11/2002 | Smith ................. G06F 11/3409 718/102 |
| 2004/0109674 A1 * | 6/2004 | Ohmori ................ G11B 27/034 386/253 |
| 2005/0105374 A1 * | 5/2005 | Finke-Anlauff et al. ..... 365/232 |
| 2005/0183143 A1 * | 8/2005 | Anderholm ............ G06F 11/32 726/22 |
| 2005/0255842 A1 * | 11/2005 | Dumas et al. ................. 455/424 |
| 2006/0148528 A1 * | 7/2006 | Jung et al. ..................... 455/566 |
| 2006/0277467 A1 * | 12/2006 | Reponen et al. .............. 715/708 |

(Continued)

OTHER PUBLICATIONS

Scheible, et al., "MobiToss: A novel gesture based interface for creating and sharing mobile multimedia art on large public displays", Retrieved at <<http://www.iamai.in/upload/reseh/mobile.pdf>>, ACM Multimedia Conference, Oct. 26-31, 2008, pp. 4.

(Continued)

*Primary Examiner* — Steven Sax
*Assistant Examiner* — Wilson Varga
(74) *Attorney, Agent, or Firm* — Julie Kane Akhter; Tom Wong; Micky Minhas (57) ABSTRACT

Activity data generated during a day or other time period on one or more computing devices is collected and aggregated. The aggregated data is then presented through an activity review user interface. The activity review user interface can be presented on a large format display device, such as a projector or television. The activity review user interface can also be navigated using natural input methods, such as gesture and voice input.

20 Claims, 10 Drawing Sheets

(56) References Cited

U.S. PATENT DOCUMENTS

| | | | |
|---|---|---|---|
| 2006/0294396 A1 | 12/2006 | Witman et al. | |
| 2007/0061247 A1 | 3/2007 | Ramer et al. | |
| 2007/0168354 A1 | 7/2007 | Ramer et al. | |
| 2007/0288247 A1* | 12/2007 | Mackay | 705/1 |
| 2008/0046218 A1* | 2/2008 | Dontcheva | G06F 11/32 702/186 |
| 2008/0195664 A1 | 8/2008 | Maharajh et al. | |
| 2008/0222613 A1 | 9/2008 | Allen et al. | |
| 2008/0276179 A1* | 11/2008 | Borenstein et al. | 715/736 |
| 2009/0193360 A1* | 7/2009 | Escuer | G06Q 10/06 715/810 |
| 2009/0271720 A1* | 10/2009 | Deshpande | G06F 11/3476 715/764 |
| 2010/0005485 A1* | 1/2010 | Tian | G06F 17/30787 725/32 |
| 2010/0056340 A1* | 3/2010 | Ellis | A61B 5/1038 482/4 |
| 2010/0156812 A1 | 6/2010 | Stallings et al. | |
| 2010/0241691 A1* | 9/2010 | Savitzky et al. | 709/203 |
| 2010/0299615 A1* | 11/2010 | Miluzzo et al. | 715/752 |
| 2010/0306233 A1* | 12/2010 | Zheng | G06F 17/30044 707/769 |
| 2010/0333020 A1* | 12/2010 | Jeong et al. | 715/810 |
| 2011/0138366 A1* | 6/2011 | Wintergerst | G06F 11/3409 717/130 |
| 2011/0173525 A1* | 7/2011 | Mukhopadhyay | G06F 11/3409 715/212 |
| 2011/0208787 A1* | 8/2011 | Sidy | 707/809 |

OTHER PUBLICATIONS

"Mobile Value Added Services in India", Retrieved at <<http://www.iamai.in/upload/research/mobile.pdf>>, Dec. 2006, pp. 1-33.

* cited by examiner

DATA COLLECTION AND AGGREGATION

COLLECTING, AGGREGATING, AND PRESENTING ACTIVITY DATA

BACKGROUND

Information workers commonly rely on a variety of different computing devices during their workday. For instance, it is not uncommon for an information worker to spend a portion of their workday in the office working on a desktop computer, another portion of the workday out of the office working on a laptop computer or a smartphone, and yet another portion of the workday working on a tablet computing device or other type of portable device. These devices are frequently connected through "cloud" services, so information captured on each device may be available on the other devices.

The time spent during the workday by an information worker utilizing each type of computing device might result in different types of data being generated. For instance, in the same workday a worker might utilize a desktop or laptop computer to create documents, send electronic mail messages, and create meetings, and also utilize a smartphone to collect information, such as notes, photos, or video, and to participate in conference calls. As a result, information workers frequently review and generate data during a workday using many different devices and applications. Consequently, it can be difficult for information workers to marshal all of the activities performed and data created during a day and to review all of this data in an efficient fashion.

It is with respect to these and other considerations that the disclosure made herein is presented.

SUMMARY

Technologies are described herein for collecting, aggregating, and presenting activity data so that a user can access and utilize use the data they generate throughout the day on a variety of devices and services. Through an implementation of the concepts and technologies disclosed herein, data generated by an information worker during a day or other time period on multiple computing devices can be collected, aggregated, filtered, and presented to the worker for efficient review. This review may be utilized to help the information worker synthesize all information and plan for the next day. The aggregated data can be presented on any one of the computing devices or, alternately, on a large format display device, such as a projector or television, and navigated using natural input methods, such as gesture and voice input. In this manner, an information worker can quickly and efficiently review data generated during a day or other time period and use this information to plan for the next day.

According to one aspect presented herein, activity data generated at one or more computing devices, such as desktop or laptop computers or smartphones, is collected during a period of time, such as a day, week, or month. Activity data is data that describes the activities performed by the user of a computing device during a particular time period, such as a day. Activity data might be generated by one or more programs executing on the computing device during the time period generated in response to user input or passive collection by background services on the device. For instance, activity data might include calendar items, notes, to-do items, electronic mail and other types of messages, audio and video files, and documents. Activity data might also include data generated by an operating system of a computing device, such as location data indicating a geographic location of the device at a particular time. Activity data might be collected from a multitude of applications executing on the same device and from multiple devices used by the same individual.

Once the activity data has been collected, the activity data is aggregated to create aggregated activity data. The aggregated activity data is a collection of all of the activity data for a user from one or more applications executing on one or more devices during a period of time. For instance, the aggregated activity data might include all of the notes, calendar items, meetings, audio and video files, to-do items, and activities performed by an information worker during a day, as well as the locations and times at which they occurred. The activity data might be aggregated on the device upon which the data was generated, another of the user's devices, or transmitted to a server computer for aggregation thereupon.

Once the activity data has been collected and aggregated, the aggregated activity data may be presented to a user by way of a suitable activity review user interface ("UI"). For instance, in one embodiment, a computing device such as a smartphone is configured for connection to a large format display device, such as a television. The computing device is configured to output the activity review UI to the large format display device. The activity review UI includes elements for allowing a user to efficiently review the activity data generated and collected for the relevant time period. In one implementation, an activity overview video is generated and presented that allows the user to quickly review the activities that took place during the relevant time period. A user may be permitted to use natural input mechanisms, like voice and gesture input, to pause and resume playback of the activity overview video.

In one example, a user might choose to review an event, such as a specific meeting. In this example, the displayed content could identify who attended the meeting (and potentially a location for each attendee), notes and documents related to the meeting, pictures taken during the meeting, searches done during the meeting, and potentially other information. All of the information would be presented as an event, and the user would be able to delve into more specific information regarding the event, as necessary.

According to various embodiments, the activity data shown in the activity review UI might be organized chronologically, by event, according to projects or tasks, by people associated with the activity data, or based upon the geographical location of the computing device when the activity data was generated. The activity review UI might also be organized in other ways in other embodiments.

According to various embodiments, the activity review user interface may be navigated using traditional input devices, such as a keyboard or mouse, on a desktop or laptop computer. The activity review user interface might also be navigated using touch input on a smartphone, table device, or other type of computing device. In other embodiments, the user may be permitted to navigate the user interface using natural input mechanisms, such as gesture or voice input. This could be done in a small form factor, or in a larger, optimized, review form factor.

It should be appreciated that this Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-8 are user interface diagrams showing various illustrative user interfaces for presenting and navigating aggregated activity data according to various embodiments disclosed herein.

DETAILED DESCRIPTION

The following detailed description is directed to technologies for collecting, aggregating, and presenting activity data. As discussed briefly above, activity data generated during a day or other time period on one or more computing devices is collected and aggregated. The aggregated data is then presented through an activity review user interface. The activity review user interface can be presented on the computing devices or on a large format display device, such as a projector or television. The activity review user interface can also be navigated using traditional input mechanisms, such as keyboard, mouse, and touch, and may also be navigated using natural input methods, such as gesture and voice input. Additional details regarding these and other features will be provided below with regard to FIGS. 1-9.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for collecting, aggregating, and presenting activity data will be described.

Figure 1:
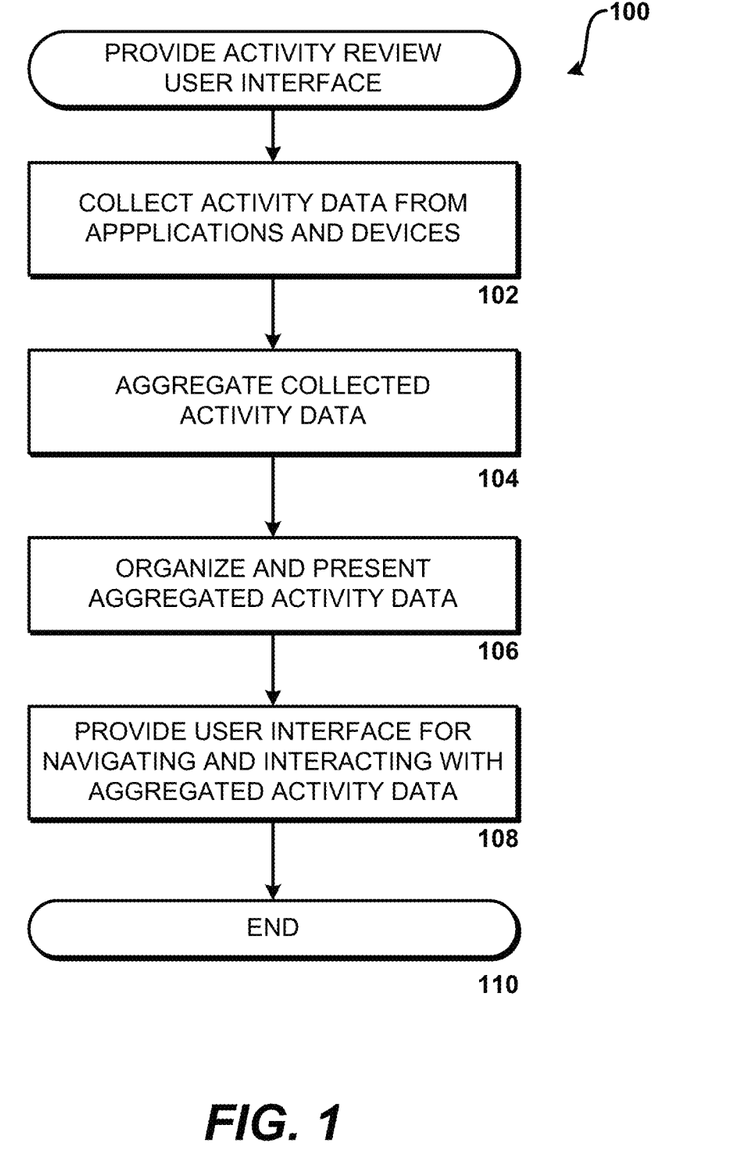
FIG. 1 is a flow diagram showing an illustrative routine for collecting, aggregating, and presenting activity data according to one embodiment disclosed herein.

FIG. 1 is a flow diagram showing aspects of one illustrative routine 100 disclosed herein for collecting, aggregating, and presenting activity data by way of an activity review user interface, according to one embodiment presented herein. It should be appreciated that the logical operations described herein with respect to FIG. 1 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 100 begins at operation 102, where activity data is collected from applications executing on one or more computing devices. As described briefly above, activity data is data that describes the activities performed by the user of a computing device during a particular time period, such as a day. Activity data might be generated by one or more programs executing on the computing device during the time period generated in response to user input. For instance, activity data might include calendar items, notes, to-do items, electronic mail and other types of messages, audio and video files, and documents. Activity data might also include data generated by an operating system of a computing device, such as location data indicating a geographic location of the device at a particular time, gestures made on the device such as shaking of the device, and information regarding audio collected by the device such as whether user's spoke in a calm or agitated tone. Activity data might be collected from a multitude of applications executing on the same device or from multiple devices used by the same individual. Additional details regarding the collection of activity data from applications and devices will be provided below with regard to FIG. 2.

From operation 102, the routine 100 proceeds to operation 104, where the collected activity data is aggregated and filtered. As discussed briefly above, the aggregated activity data is a collection of all of the activity data for a user from one or more applications executing on one or more computing devices during a period of time. For instance, the aggregated activity data might include all of the notes, calendar items, meetings, audio and video files, to-do items, and activities performed by an information worker in one day, week, or month. The activity data might be aggregated on the same device upon which the data was generated or transmitted to a server computer for aggregation thereupon.

Data might also be aggregated according to the "event" at which the data was collected. For instance, as described briefly above, data might be aggregated that identifies all of the people who attended a meeting (and potentially a location for each attendee), notes and documents related to the meeting, pictures taken during the meeting, searches done during the meeting, and potentially other information. As will be described in greater detail below, all of this information can be presented as an event, and a user may be able to delve into more specific information regarding the event, as necessary. Additional details regarding the aggregation of collected activity data will be provided below with regard to FIGS. 2 and 3.

From operation 104, the routine 100 proceeds to operation 106, where the aggregated activity data is organized and presented to a user for review. According to various embodiments, the aggregated activity data may be organized chronologically, by event, according to projects or tasks, by people associated with the activity data, or based upon the geographical location of the computing device when the activity data was generated. The aggregated activity data might also be organized in other ways in other embodiments.

As also described briefly above, the aggregated activity data might also be presented in an appropriate activity review UI at operation 108. As discussed briefly above, a computing device such as a smartphone, is configured in one embodiment for connection to a large format display device, such as a television. The computing device is configured to output the activity review UI to the large format display device. The activity review UI includes elements for allowing a user to efficiently review the activity data generated and collected for the relevant time period. In one implementation, an activity overview video is generated and presented that allows the user to quickly review the activities that took place during the relevant time period. It should be appreciated that the activity review UI might also be presented on any of the devices that collected the data or other devices, such as a desktop, laptop, or table computer.

According to embodiments, various actions can be taken using the activity review UI. For instance, an e-mail message might be transmitted to all of the attendees of a meeting. In another example, an overall task list might be generated and displayed for all of the tasks created during a meeting. Each task might be assigned a higher or lower priority or assigned to another individual for handling. Other types of actions might also be taken through the activity review UI with respect to the aggregated activity data.

The activity review UI may be navigated using traditional input devices, such as a keyboard or mouse. In other embodiments, however, a user may be permitted to navigate the activity review UI using natural input mechanisms, such as gesture or voice input, when hardware supporting such input is available. Additional details regarding the presentation of aggregated activity data and the activity review UI will be provided below with regard to FIGS. 4-8.

Figure 2:
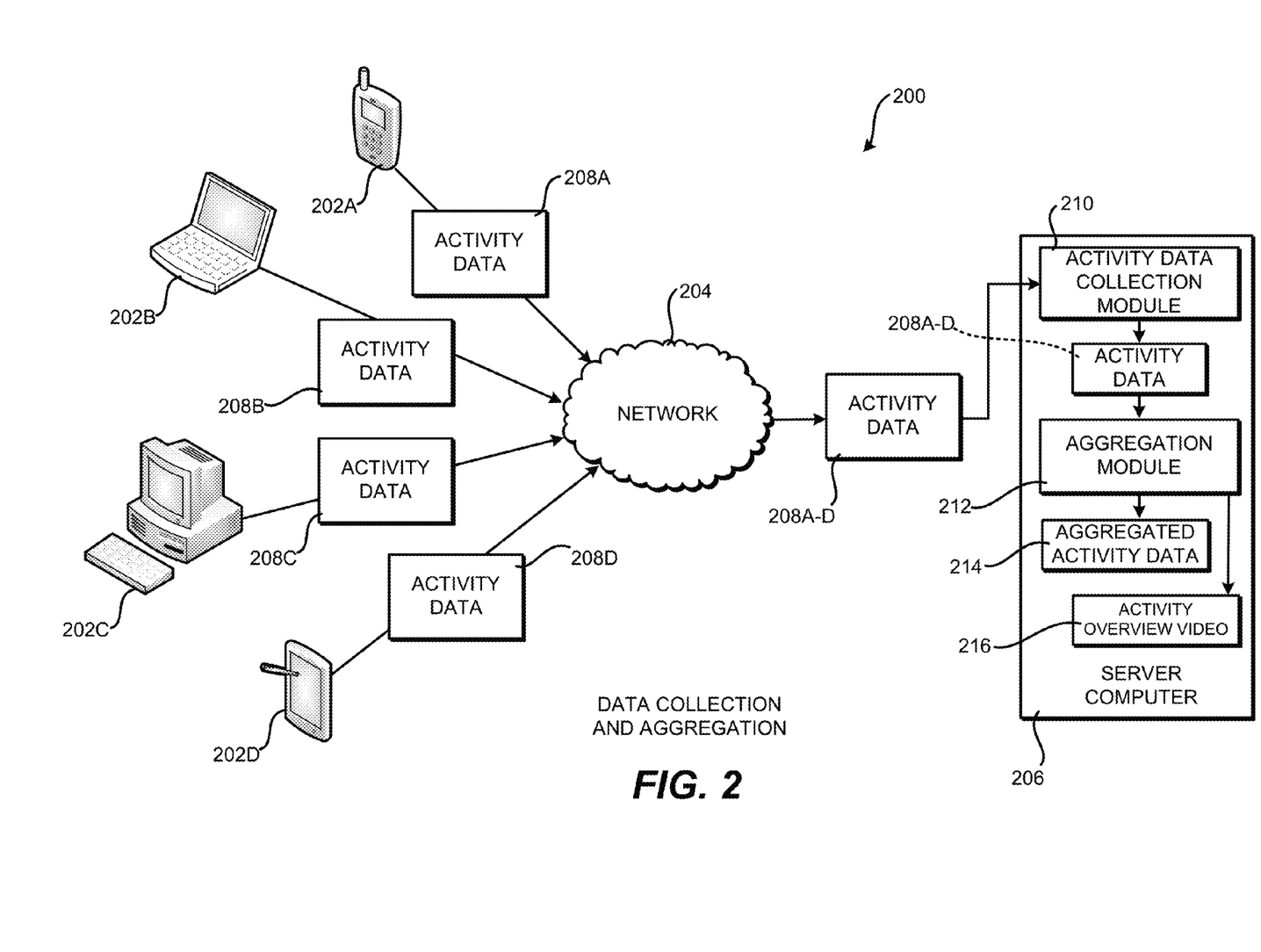
FIG. 2 is a computer system and network diagram showing one illustrative operating environment for the embodiments disclosed herein and aspects of the various processes described herein for collecting and aggregating activity data.

FIG. 2 is a computer system and network diagram showing one illustrative operating environment for the embodiments disclosed herein along with aspects of the various processes described herein for collecting and aggregating activity data. As shown in FIG. 2, a number of computing devices 202A-202D might be utilized by a user. For instance, at various times a user might utilize a smartphone computing device 202A, a laptop computing device 202B, a desktop computing device 202C, and a table computing device 202D. The user might also use other types of computing devices not illustrated in FIG. 2.

During any given time period a user might use all or a subset of the computing devices 202A-202D shown in FIG. 2. For instance, in the same workday a user might utilize a laptop computing device 202B to create documents, send electronic mail messages, and create meetings, and also utilize a smartphone computing device 202A to collect information, such as notes, photos, or video, and to participate in conference calls. As a result, the user might review and generate activity data during a workday using many different devices and applications.

According to the various embodiments presented herein, each of the computing devices 202A-202D is configured to collect activity data 208A-208D (which may be referred to herein collectively as the "activity data 208"), respectively, generated by a user. As described above, the activity data 208A-208D is data that describes the activities performed by the user of a computing device 202A-202D during a particular time period, such as a day. The activity data 208 might be generated by one or more programs executing on the computing devices 202A-202D during the time period generated in response to user input. For instance, the activity data 208 might include calendar items, notes, to-do items, electronic mail and other types of messages, audio and video files, and documents. The activity data 208 might also include other types of information.

As shown in FIG. 2, the computing devices 202A-202D are configured in one embodiment to transmit the activity data 208A-208D, respectively, to a server computer 206 by way of the network 204. The network 204 might be any suitable wireless or wired network, such as the Internet. In the embodiment shown in FIG. 2, an activity data collection module 210 executing on the server computer 206 receives the activity data 208 from the devices 202A-202D. The activity data collection module 210 passes the collected activity data 208 to an aggregation module 212, described below.

The aggregation module 212 is configured to receive the activity data 208 and to aggregate the activity data 208 received from different applications and computing devices to create the aggregated activity data 214. As discussed above, the aggregated activity data 214 is a collection of all of the activity data 208 for a user from one or more applications executing on one or more computing devices 202A-202D during a period of time.

For instance, the aggregated activity data 214 might include all of the notes, calendar items, meetings, audio and video files, to-do items, and other activities reviewed, created, or performed by a user in a certain time period, such as one day, week, or month. As will be describe in greater detail below, the aggregated activity data 214 might be consumed by a program executing on one of the computing devices 202A-202D to present the activity review UI described above. Additional details regarding this process will be provided below with regard to FIGS. 4-8.

According to one embodiment, the aggregation module 212 is configured to generate an activity overview video 216 from the aggregated activity data 214. The activity overview video 216 is a multimedia video file that summarizes the activity data 208 collected during a time period. For instance, the activity overview video 216 might include audio and visual information summarizing all of the activities, notes, tasks and other activities performed by a user on any of the computing devices 202A-202D during a certain time period. The computing devices 202A-202D, or another device, might be utilized to view and interact with the activity overview video 216. The activity overview video 216 might also be formatted similarly to the activity review UI shown in FIGS. 5A-8 and described below. An audio-only version of the activity overview video 216 might also be created for playback on audio devices.

It should be appreciated that the architecture and implementation shown in FIG. 2 is merely illustrative and that other implementations might be utilized. For instance, in other embodiments, the activity collection module 210 and the aggregation module 212 are configured for execution directly on one of the computing devices 202A-202D. In this manner, the various processes described above as being performed on the server computer 206 might be performed directly on one of the computing devices 202A-202D. For instance, a process executing on one of the computing devices 202A might collect activity data from various applications executing on the device 202A, aggregate the collected activity data, and provide an appropriate user interface for reviewing the aggregated data on the device 202A. The aggregated data might then be made available from the server computer 206 or from any of the other devices 202A-202D. Other implementations will be apparent to those skilled in the art.

Figure 3:
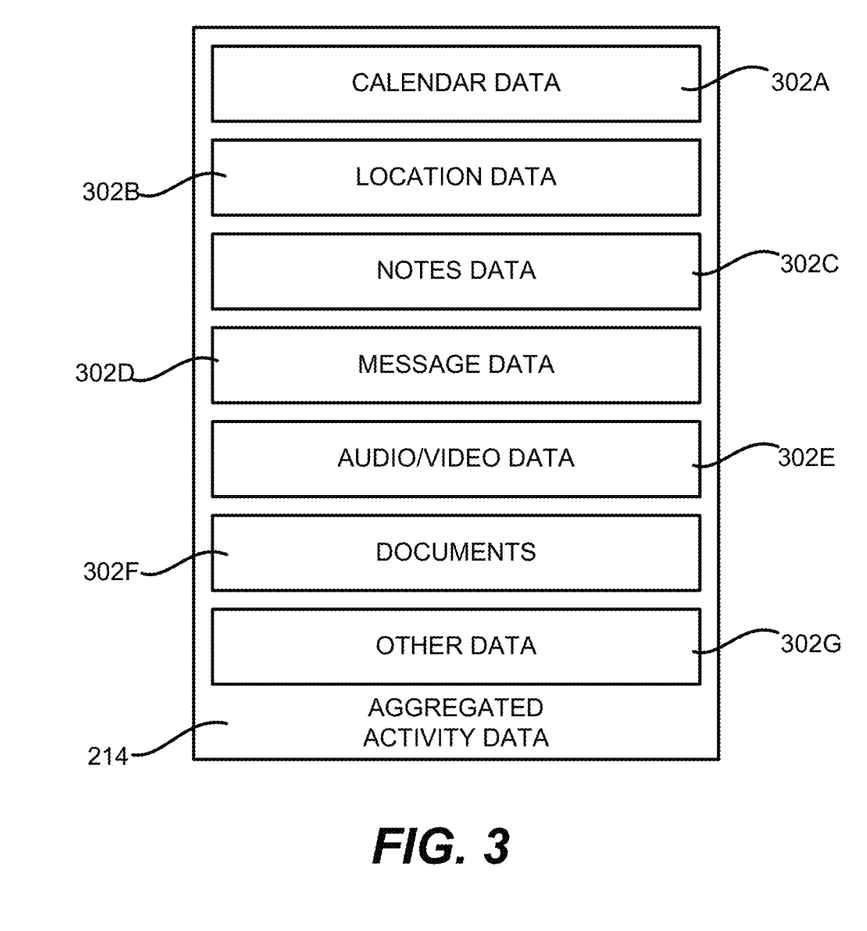
FIG. 3 is a data structure diagram showing aspects of aggregated activity data according to one embodiment disclosed herein.

FIG. 3 is a data structure diagram showing aspects of the aggregated activity data 214 according to one embodiment disclosed herein. As discussed above, the aggregated activity data 214 is a collection of all of the activity data 208 for a user from one or more applications executing on one or more computing devices 202 during a period of time. Consequently, the aggregated activity data 214 might include calendar data 302A that includes calendar items, location data 302B that includes data identifying a geographic location of a computing device at a particular period of time, notes data 302C contacting notes taken by a user, message data 203D containing sent or received electronic messages, audio/video data 302E including audio, video, or images captured by a computing device 202, and/or documents 302F created or reviewed on the computing device 202. The aggregated activity data 214 might also include other data 302G. Additional details regarding the presentation of the aggregated activity data 214 will be presented below with regard to FIGS. 4-8.

Figure 4:
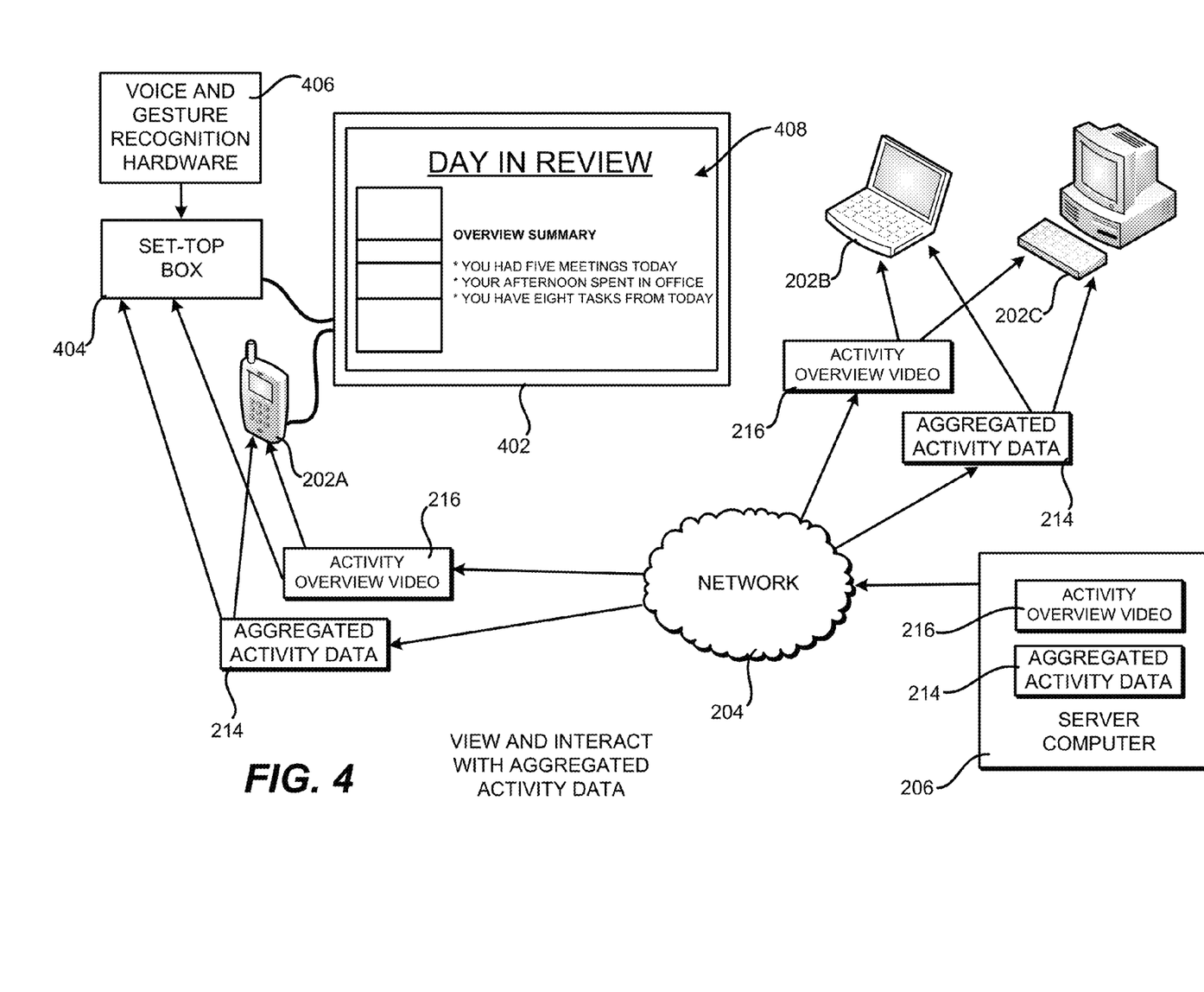
FIG. 4 is a computer system and network diagram showing aspects of the various processes described herein for presenting and navigating aggregated activity data according to one embodiment disclosed herein.

FIG. 4 is a computer system and network diagram showing aspects of the various processes described herein for presenting and navigating aggregated activity data 214 according to one embodiment disclosed herein. As discussed above with regard to FIG. 2, a server computer 206 is configured in one embodiment to generate the aggregated activity data 214 and/or an activity overview video 216. In this embodiment, the server computer 206 is further configured to send the aggregated activity data 214 and/or an activity overview video 216 to one or more of the computing devices 202 for presentation to a user.

For instance, in the example shown in FIG. 4, the server computer 206 has transmitted the aggregated activity data 214 and/or an activity overview video 216 to the laptop computing device 202B and the desktop computing device 202C. A software component executing on the devices 202A-202B is configured to receive and display the aggregated activity data 214 and/or the activity overview video 216 in an appropriate user interface, such as the user interfaces described below with regard to FIGS. 5A-8. A user of the laptop computing device 202B and the desktop computing device 202C might utilize mouse, keyboard, touch, and other kinds of input to interact with and navigate through the provided user interface.

In the example shown in FIG. 4, the server computer 206 has also transmitted the aggregated activity data 214 and/or the activity overview video 216 to the smartphone computing device 202A. In this example, the smartphone computing device 202A is configured with a video output port for connection to an appropriate large format display device 402. For instance, the smartphone computing device 202A might be configured with a High-Definition Multimedia Interface ("HDMI") port suitable for connection to a television, large screen monitor, projector, or other type of large format display device. In this manner, a video output can be provided from the smartphone computing device 202A for displaying a user interface 408 for reviewing the aggregated activity data 216 on a large screen display. Other types of wired and wireless interfaces might also be utilized to present data on a large format display device.

In the example shown in FIG. 4, the server computer 206 has also transmitted the aggregated activity data 214 and/or the activity overview video 216 to a set-top box 404. The set-top box 404 also includes an appropriate video connection to the large format display device 402, such as an HDMI connection. The set-top box 404 is also equipped with voice and/or gesture recognition hardware 406 and appropriate software. Through the use of the voice and/or gesture recognition hardware 406, the set-top box 404 can recognize natural input, such as audio input or gesture input. As known to those skilled in the art, the voice and gesture recognition hardware 406 might include one or more microphones or arrays of microphones, RGB cameras, depth sensors, infrared emitters, infrared cameras, and other devices. One example of such hardware is the KINECT sensor from MICROSOFT CORPORATION of Redmond, Wash.

The set-top box might be a video game system, cable box, dedicated set-top box, or another type of component. The voice and/or gesture recognition hardware 406 might also be connected to and utilized with another type of computing device, such as the laptop computing device 202B or the desktop computing device 202C. As will be described in greater detail below, the various types of user input devices and mechanisms disclosed above might be utilized to navigate the activity review UI presented by one of the computing devices 202A-202B for reviewing the aggregated activity data 214. Additional details regarding this process will be provided below with regard to FIGS. 5A-8.

FIGS. 5A-8 are user interface diagrams showing various illustrative user interfaces for presenting and navigating the aggregated activity data 214 according to various embodiments disclosed herein. As discussed above, the user interfaces shown in FIGS. 5A-8 and described below might be presented by any of the computing devices 202A-202D on their native displays or the large format display device 402, and navigated using the input mechanisms described above, including natural language input mechanisms, such as voice and gesture input.

Figure 5A:
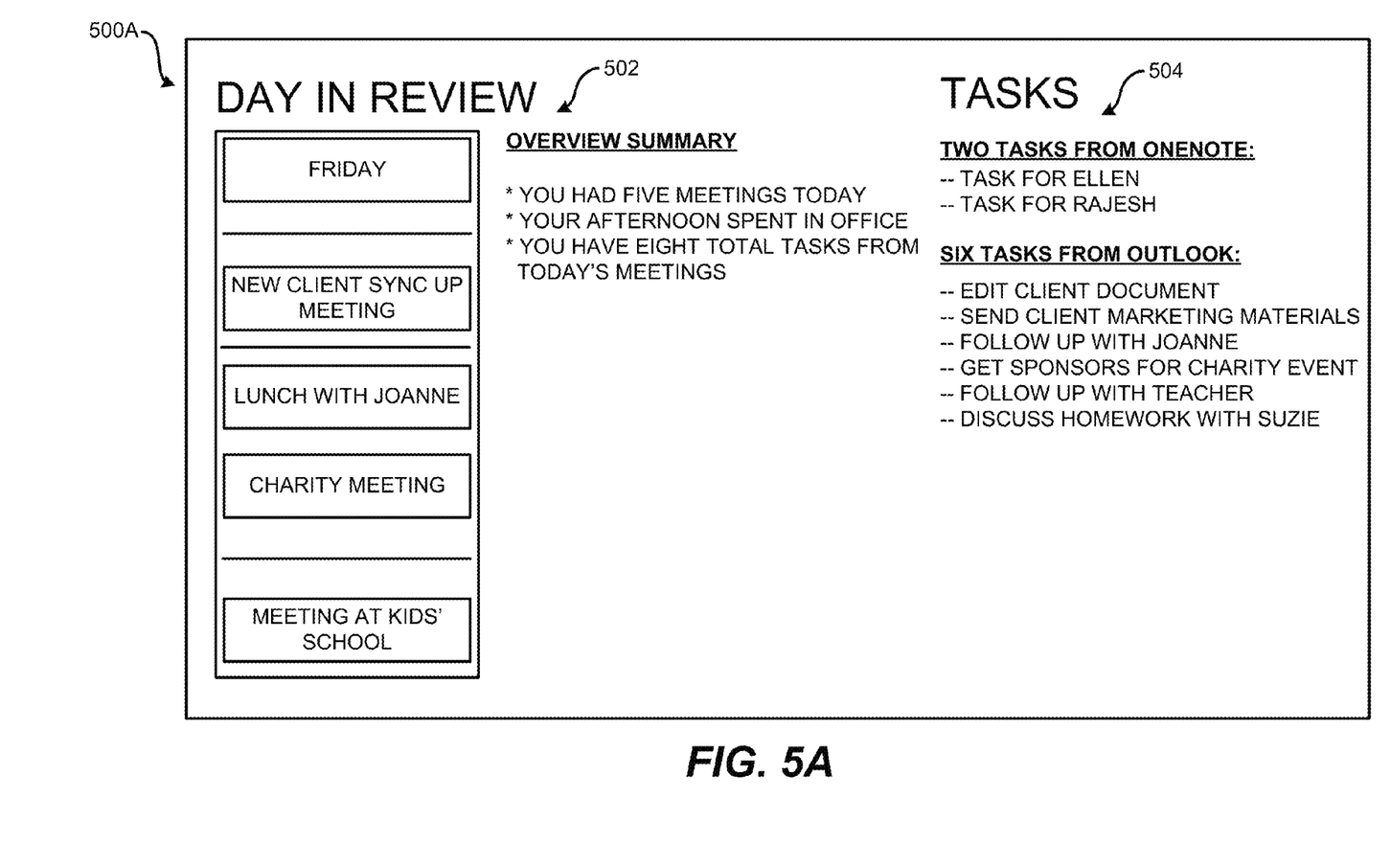
Figure 5B:
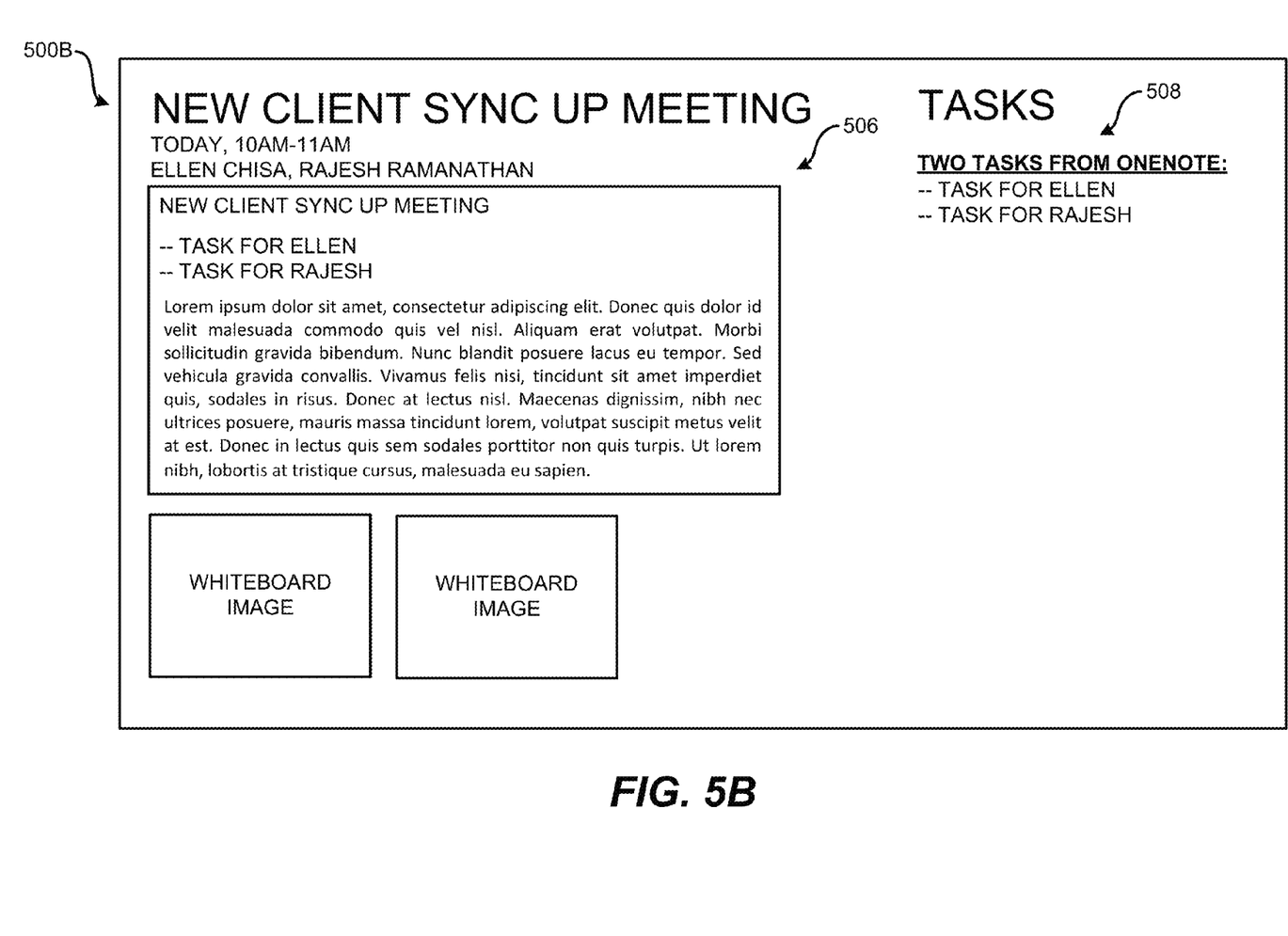

The user interface 500A shown in FIG. 5A is configured to present the aggregated activity data 214 in a chronologically organized fashion organized by event. In particular, the user interface 500A shown in FIG. 5A provides a summary of the events in a particular period of time, such as a day. An overview portion 502 of the user interface 500A shows a snapshot of the calendar items for the day and provides a textual summary of the day's events. For instance, in the example shown in FIG. 5A, the overview portion 500A indicates that five events (meetings) took place during a day, that the afternoon was spent in the office, and that eight tasks were generated from the meetings. Other types of summary information might also be provided.

The user interface 500A also includes a tasks portion 504, which provides details regarding the new tasks created during the time period. In the example shown in FIG. 5A, eight tasks are identified and are sorted according to the application that was used to create the tasks. Other mechanisms might be utilized to sort the tasks. Other types of information might also be provided in the user interface 500A.

In one embodiment, user interface controls corresponding to the events shown in the calendar in the overview portion 502 might be selected in order to obtain additional information regarding a particular selected meeting. For example, if the meeting entitled "New Client Sync Up Meeting" in FIG. 5A is selected, the user interface 500B shown in FIG. 5B might be displayed. In the user interface 500B, details regarding the selected meeting are provided. For instance, in the example shown in FIG. 5B, a detail portion 506 includes details regarding the event, including the date and time of the meeting, the meeting attendees, the meeting agenda, notes taken during the meeting, photographs taken during the meeting, notes sent out after the meeting, and task items collected during the meeting. The task items collected during the meeting may be displayed separately in a task portion 508 and arranged according to the application utilized to create the application. The user may be permitted to return to the user interface 500A using an appropriate input command, such as a keyboard command or a swipe gesture. Other data might also be displayed in the user interface 500B.

Figure 6:
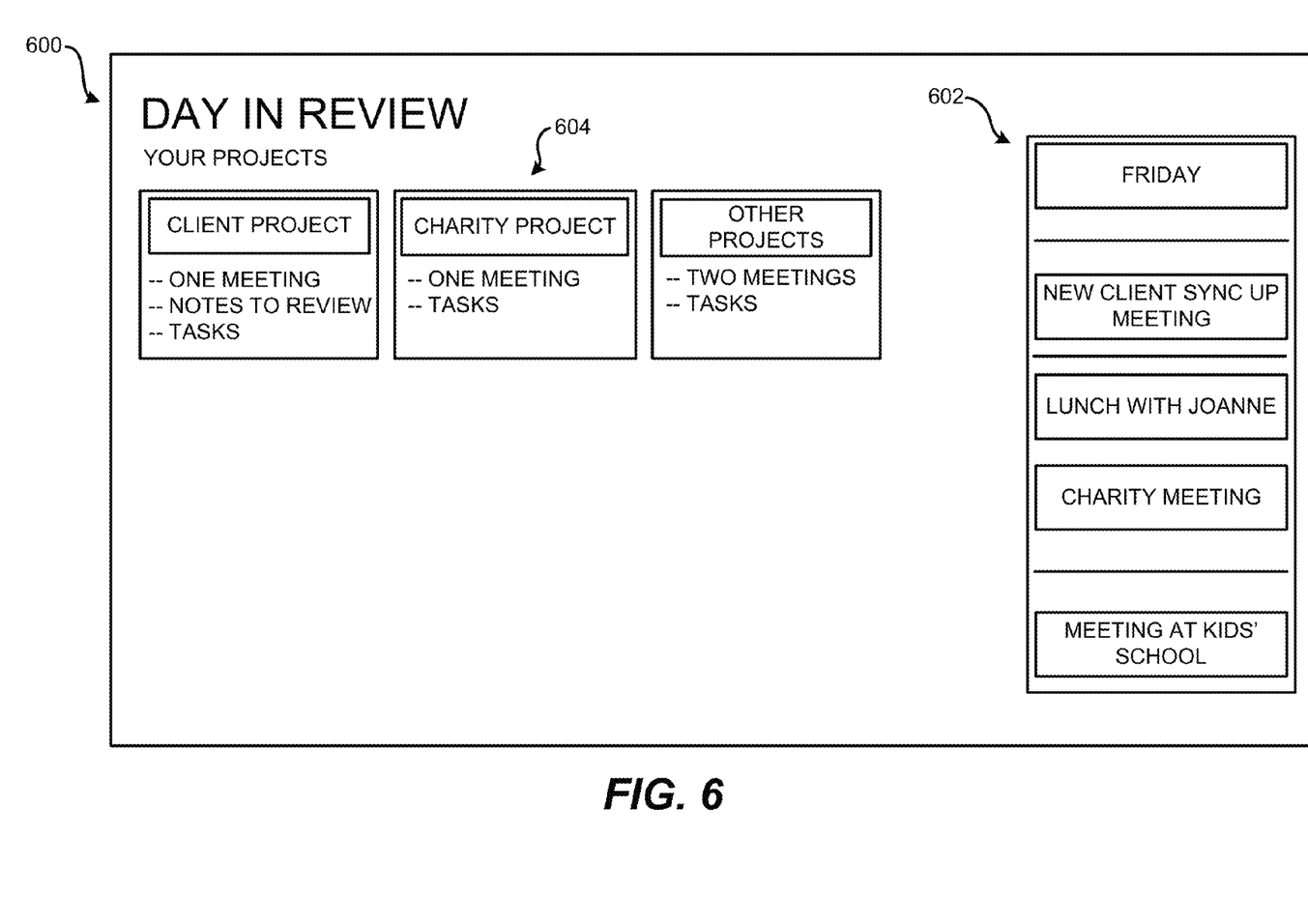

The user interface 600 shown in FIG. 6 is configured to present the aggregated activity data 214 in manner that is organized by project. In particular, the user interface 600 includes a project overview section 604 that organizes tasks created during the time period according to the project they belong to. The appropriate project might be specified explicitly, determined based upon the location of relevant materials, such as documents, by meeting titles, or in another way. The user interface 600 might also include a calendar portion 602 showing a calendar for the time period.

Figure 7:
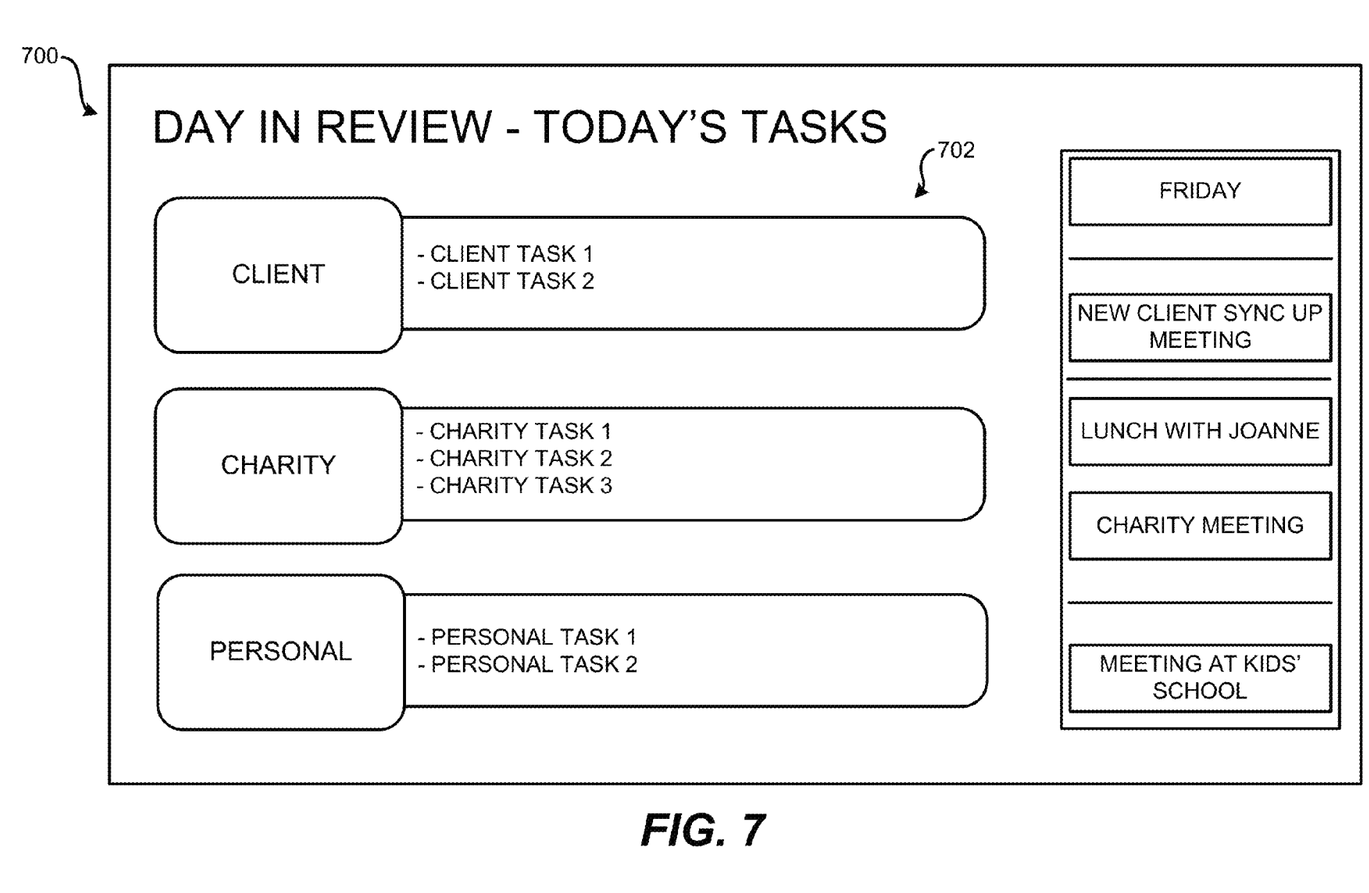

The user interface 700 shown in FIG. 7 is configured to present the aggregated activity data 214 in manner that is organized by task. In particular, the user interface 700 includes a task overview section 702 that organizes tasks created during the time period according the associated client or other category. The tasks might also be organized according to the type of task. For instance, similar tasks like tasks for sending e-mails, tasks for aggregating notes, phone calls to make, or tasks to be subdivided might be grouped together. The user interface 600 might also include a calendar portion showing a calendar for the time period.

Figure 8:
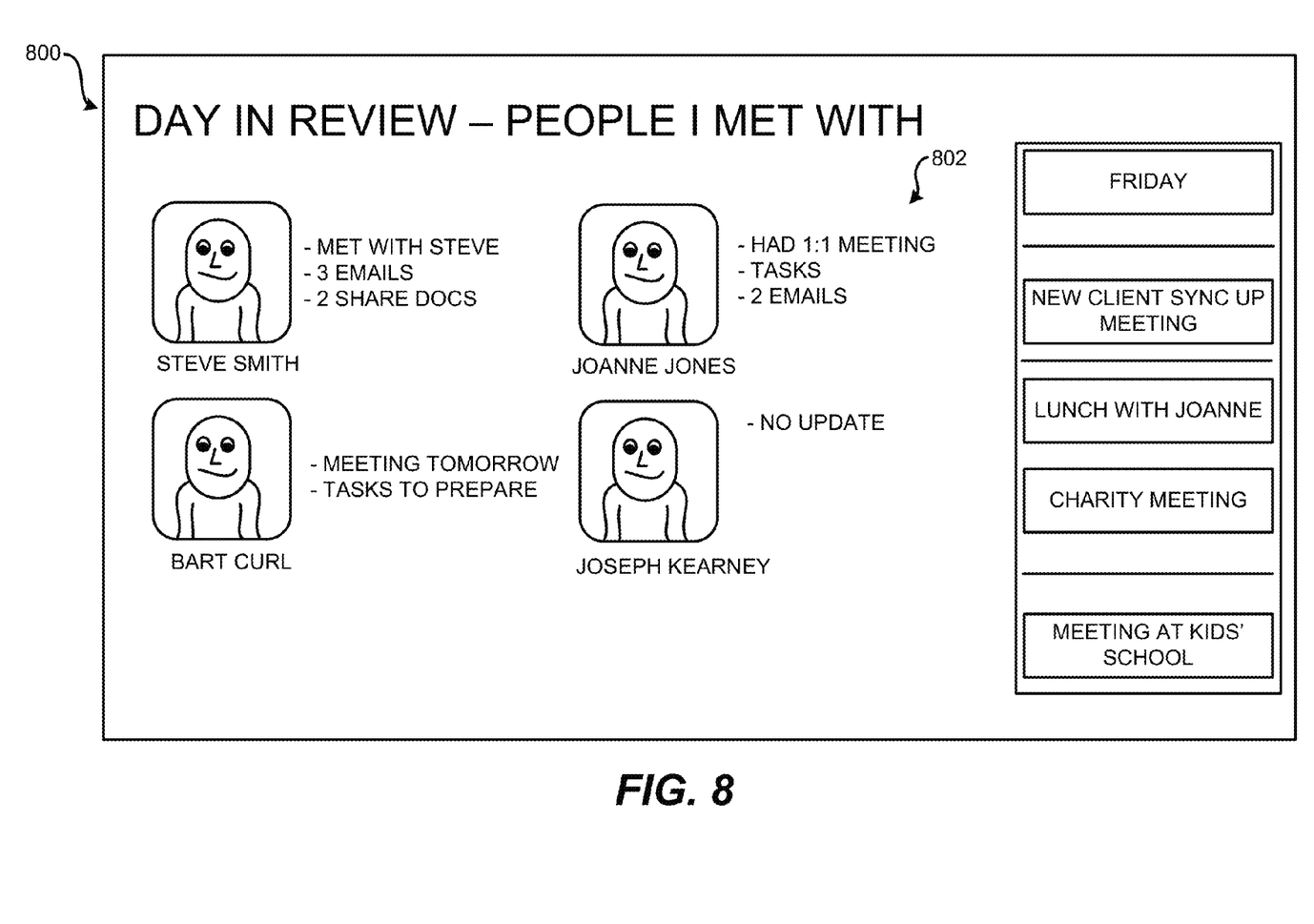

The user interface 800 shown in FIG. 8 is configured to present the aggregated activity data 214 in manner that is organized according to one or more people associated with the activity data. In particular, the user interface 800 includes an overview portion 802 that shows the activity data for the appropriate time period arranged according to the person associated with the activity data. For instance, during the relevant time period, a meeting was held with an individual named "Steve Smith." Three e-mail messages were exchanged with Mr. Smith and two documents were shared. Other types of activity data associated with individuals might also be displayed in the overview portion 802.

It should be appreciated that user interfaces shown in FIGS. 5A-8 are merely illustrative and that other user interfaces might be provided that organize the aggregated activity data in way other than those shown in FIGS. 5A-8. For instance, the aggregated activity data 214 shown in the activity review user interface might be organized according to a geographic location of the computing device at the time the activity data is captured. Other user interfaces and mechanisms for organizing the aggregated activity data 214 might also be utilized.

As discussed above, the user interfaces shown in FIGS. 5A-8 might be navigable in several ways. For instance, the user interfaces might be directly navigable on a computing device using a native user input mechanism, such as a keyboard, mouse, or touch. As also describe above, natural user input mechanisms, like voice and gesture input, might also be utilized. For instance, when navigating the activity overview video 216 described above, a user may be permitted to say, "stop," or use an appropriate gesture to stop on a particular set of content to review. The user might then say, "continue," or use an appropriate gesture to continue reviewing the content.

In other embodiments, a user might be permitted to view the aggregated activity data 214 on a large format display device 402 and, concurrently, to modify or augment the data using another computing device 202. For instance, a user might be permitted to mark items as tasks, add tasks to a "follow up" list, or mark items as being of high importance. Because the aggregated activity data 214 is stored at the server computer 206 in one embodiment, multiple computing devices 202 might access and utilize this data concurrently in different ways.

Figure 9:
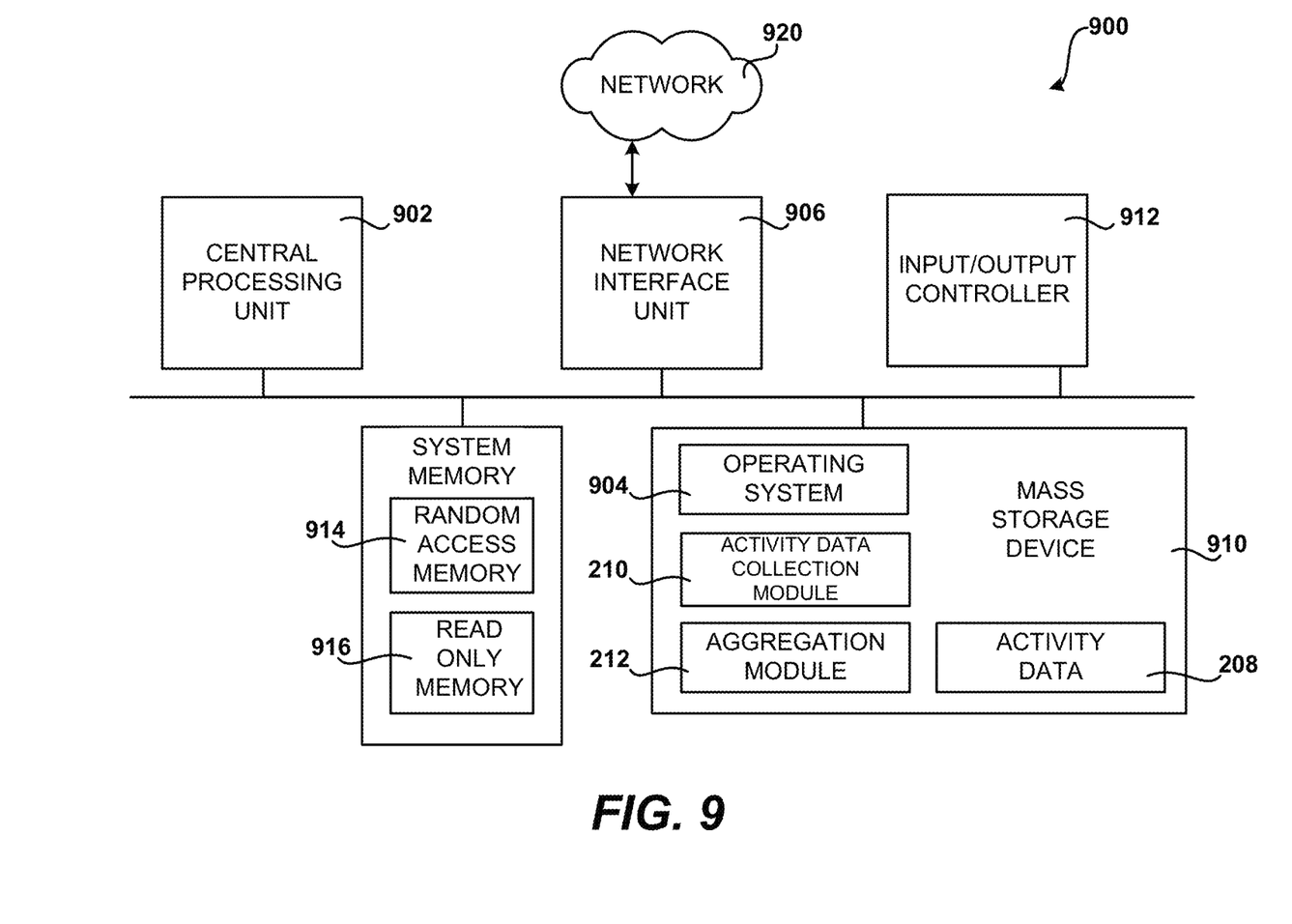
FIG. 9 is a computer architecture diagram showing an illustrative computer hardware and software architecture for a computing system capable of implementing the various embodiments presented herein.

FIG. 9 is a computer architecture diagram showing an illustrative computer hardware and software architecture for a computing system capable of implementing the various embodiments presented herein. The computer architecture shown in FIG. 9 illustrates a conventional desktop, laptop computer, or server computer and may be utilized to execute the various software components described herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system ("BIOS") containing the basic routines that help to transfer information between elements within the computer 900, such as during startup, is stored in the ROM 916. The computer 900 further includes a mass storage device 910 for storing an operating system 918, application programs, and other program modules, which will be described in greater detail below.

The mass storage device 910 is connected to the CPU 902 through a mass storage controller (not shown) connected to the bus 904. The mass storage device 910 and its associated computer-readable storage media provide non-volatile storage for the computer 900. Although the description of computer-readable media contained herein refers to a mass storage device, such as a hard disk or CD-ROM drive, it should be appreciated by those skilled in the art that computer-readable storage media can be any available computer storage media that can be accessed by the computer 900.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 900.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 900 may operate in a networked environment using logical connections to remote computers through a network such as the network 920. The computer 900 may connect to the network 920 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9).

Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system 904 suitable for controlling the operation of a networked desktop, laptop, or server computer. The mass storage device 910 and RAM 914 may also store one or more program modules. In particular, the mass storage device 910 and the RAM 914 may store one or more of the software components described above. The mass storage device 910 and RAM 914 may also store other program modules and data.

In general, software applications or modules may, when loaded into the CPU 902 and executed, transform the CPU 902 and the overall computer 900 from a general-purpose computing system into a special-purpose computing system customized to perform the functionality presented herein. The CPU 902 may be constructed from any number of transistors or other discrete circuit elements, which may individually or collectively assume any number of states. More specifically, the CPU 902 may operate as one or more finite-state machines, in response to executable instructions contained within the software or modules. These computer-executable instructions may transform the CPU 902 by specifying how the CPU 902 transitions between states, thereby physically transforming the transistors or other discrete hardware elements constituting the CPU 902.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for collecting, aggregating, and presenting activity data have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:
   collecting activity data generated by two or more application programs executing on two or more computing devices during a time period for a user of the two or more computing devices;
   aggregating the collected activity data to generate aggregated activity data for the time period,
      wherein the aggregated activity data comprises an activity overview video that summarizes the activity data collected during the time period and a user interface to allow the review of the aggregated activity data, wherein the activity overview video comprises a multimedia file and
      wherein the aggregated activity data further comprises one or more of calendar data, location data, notes data, message data, audio data, video data, or a document utilized on or generated by the computing device during the time period;
   providing the aggregated data to the two or more computing devices, wherein at least one of the two or more devices is a portable device; and
   providing the user interface for reviewing the aggregated activity data on the two or more computing devices, at least one of the two or more computing devices configured to provide the user interface on a large format display device.

2. The computer-implemented method of claim 1, wherein the two or more computing devices are configured to aggregate the collected activity data to generate the aggregated activity data.

3. The computer-implemented method of claim 1, wherein the two or more computing devices and a server computer are configured to aggregate the collected activity data to generate the aggregated activity data.

4. The computer-implemented method of claim 1, wherein the user interface for reviewing the aggregated activity data is provided by any of the two or more computing devices.

5. The computer-implemented method of claim 4, wherein at least one of the two or more computing devices is connected to the large format display device and configured to display the user interface on the large format display device.

6. The computer-implemented method of claim 1, wherein the user interface for reviewing the aggregated activity data can be navigated using gesture input.

7. The computer-implemented method of claim 6, wherein the user interface for reviewing the aggregated activity data can further be navigated using voice input.

8. The computer-implemented method of claim 1, wherein the aggregated activity data presented in the user interface is organized chronologically.

9. The computer-implemented method of claim 1, wherein the aggregated activity data presented in the user interface is organized according to one or more projects.

10. The computer-implemented method of claim 1, wherein the aggregated activity data presented in user interface is organized according to one or more tasks created during a meeting.

11. The computer-implemented method of claim 1, wherein the aggregated activity data presented in the user interface is organized according to one or more people associated with the activity data.

12. The computer-implemented method of claim 1, wherein the aggregated activity data presented in the user interface is organized according to a location of one of the two or more computing devices.

13. The computer-implemented method of claim 1, wherein the aggregated activity data presented in the user interface is organized according to an event.

14. A computer-readable storage medium having computer-executable instructions stored thereupon which, when executed by a computer, cause the computer to:
 collect activity data generated on two or more application programs executing on two or more devices during a time period for a user of the two or more computing devices, wherein at least one of the two or more devices is a portable device;
 aggregate the collected activity data to generate aggregated activity data for the time period,
  wherein the aggregated activity data comprises an activity overview video that summarizes the activity data collected during the time period and a user interface to allow the review of the aggregated activity data, wherein the activity overview video comprises a multimedia file and
  wherein the aggregated activity data further comprises one or more of calendar data, location data, notes data, message data, audio data, video data, or a document utilized on or generated by the two or more computing devices during the time period;
 provide the aggregated data to the two or more devices; and
 provide the user interface for reviewing the aggregated activity data on the two or more devices, at least one of the two or more devices configured to provide the user interface on a large format display device.

15. The computer-readable storage medium of claim 14, wherein the user interface comprises an interface for navigating the activity data that can be navigated using gesture and voice input.

16. The computer-readable storage medium of claim 15, wherein the collected activity data is aggregated at one or more of the two or more devices or a server computer.

17. The computer-readable storage medium of claim 16, wherein the user interface provides functionality for transmitting an e-mail message to one or more meeting attendees and to generate and display a task list containing tasks generated during a meeting.

18. An apparatus comprising:
 a processor; and
 a computer-readable storage media having executable instructions stored thereupon which, when executed by the processor, cause the apparatus to
  collect activity data generated by two or more applications executing on two or more computing devices during a day, wherein at least one of the two or more devices is a portable device;
  provide the collected activity data to the two or more computing devices; aggregate the collected activity data to generate an activity overview video that summarizes the activity data collected during the day by one or more of chronologically, by event, according to projects or tasks, by people associated with the activity data and a geographical location of the computing devices when the activity data was collected;
  provide a user interface for reviewing the aggregated activity data on the two or more computing devices, at least one of the two or more computing devices configured to provide the user interface on a large format display device for viewing the activity overview video, the activity overview video comprises a multimedia file; and to enable the use of gesture input to navigate the activity overview video shown on the large format display device.

19. The apparatus of claim 18, wherein the aggregated activity data presented in the user interface is organized according to a location of one of the two or more computing devices.

20. The apparatus of claim 18, wherein the aggregated activity data presented in the user interface is organized according to an event.

* * * * *